(12) United States Patent
Fontana

(10) Patent No.: US 7,291,697 B2
(45) Date of Patent: *Nov. 6, 2007

(54) RESINATES FROM MONOMER

(75) Inventor: Thomas A Fontana, Orange Park, FL (US)

(73) Assignee: Arizona Chemical Company, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/099,438

(22) Filed: Apr. 4, 2005

(65) Prior Publication Data

US 2006/0009543 A1    Jan. 12, 2006

Related U.S. Application Data

(63) Continuation of application No. 10/402,348, filed on Mar. 28, 2003, now Pat. No. 6,875,842.

(60) Provisional application No. 60/369,106, filed on Mar. 28, 2002.

(51) Int. Cl.
 C09F 1/00    (2006.01)
(52) U.S. Cl. .............. 530/210; 530/200; 530/211; 530/224
(58) Field of Classification Search .......... 530/200, 530/210, 211, 224
See application file for complete search history.

(56) References Cited

U.S. PATENT DOCUMENTS

| | | | |
|---|---|---|---|
| 2,369,125 A | 2/1945 | Anderson | |
| 2,478,490 A | 8/1949 | Krumbhaar | |
| 2,572,086 A | 10/1951 | Wittcoff et al. | |
| 2,590,910 A | 4/1952 | Wittcoff et al. | |
| 3,468,829 A | 9/1969 | Yoshioka et al. | |
| 3,880,788 A | 4/1975 | Rudolphy | |
| 3,969,233 A | 7/1976 | Lucas | |
| 3,997,487 A | 12/1976 | Rees et al. | |
| 4,015,999 A | 4/1977 | Robertson et al. | |
| 4,072,734 A | 2/1978 | Nakata et al. | |
| 4,079,102 A | 3/1978 | Wagner et al. | |
| 4,092,283 A | 5/1978 | Oishi et al. | |
| 4,092,469 A | 5/1978 | Uraneck et al. | |
| 4,170,480 A | 10/1979 | Ikenoue et al. | |
| 4,175,979 A | 11/1979 | Robertson et al. | |
| 4,178,265 A | 12/1979 | Matsuda et al. | |
| 4,198,329 A | 4/1980 | Rudolphy et al. | |
| 4,207,219 A | 6/1980 | Rudolphy | |
| 4,244,866 A | 1/1981 | Schefbauer | |
| 4,250,066 A | 2/1981 | Schefbauer | |
| 4,284,541 A | 8/1981 | Takeda et al. | |
| 4,301,055 A | 11/1981 | Schefbauer | |
| 4,342,606 A | 8/1982 | Notton | |
| 4,391,640 A | 7/1983 | Okoshi et al. | |
| 4,455,360 A | 6/1984 | Ishikawa et al. | |
| 4,482,621 A | 11/1984 | Kashiwagi | |
| 4,755,550 A | 7/1988 | Shuman et al. | |
| 4,767,835 A | 8/1988 | Janusz | |
| 4,851,153 A | 7/1989 | Kono et al. | |
| 4,857,624 A | 8/1989 | DeBlasi et al. | |
| 5,021,269 A | 6/1991 | Kono et al. | |
| 5,059,272 A | 10/1991 | Kono et al. | |
| 5,082,497 A | 1/1992 | LeVine et al. | |
| 5,137,569 A | 8/1992 | Waldron et al. | |
| 5,164,446 A | 11/1992 | Boswell et al. | |
| 5,166,256 A | 11/1992 | Boswell et al. | |
| 5,166,257 A | 11/1992 | Boswell et al. | |
| 5,166,258 A | 11/1992 | Boswell et al. | |
| 5,166,262 A | 11/1992 | Boswell et al. | |
| 5,180,774 A | 1/1993 | LeVine et al. | |
| 5,217,812 A | 6/1993 | Lee | |
| 5,302,648 A | 4/1994 | Fujimoto et al. | |
| 5,306,342 A | 4/1994 | Stirling | |
| 5,380,800 A | 1/1995 | Bender et al. | |
| 5,382,281 A | 1/1995 | Kuo | |
| 5,427,612 A | 6/1995 | Bender | |
| 5,512,622 A | 4/1996 | Tise et al. | |
| 5,698,668 A | 12/1997 | Bender | |
| 5,699,668 A | 12/1997 | Cox | |
| 5,708,078 A | 1/1998 | Bender et al. | |
| 5,763,373 A | 6/1998 | Robinson et al. | |
| 6,069,119 A | 5/2000 | Robinson et al. | |
| 6,190,444 B1 | 2/2001 | Okuda et al. | |
| 6,417,254 B1 | 7/2002 | Kobayashi | |

FOREIGN PATENT DOCUMENTS

EP    0955325    11/1999

*Primary Examiner*—Irina S Zemel
(74) *Attorney, Agent, or Firm*—Joseph W. Segers, III; J. Mark Gilbreth; Deborah G. Segers

(57) ABSTRACT

Reduced-rosin compositions of printing inks and the resinate binders therein, and the processes of preparation thereof, are described. In said compositions, a portion of the rosin normally used in the art is replaced by Monomer, and is further reacted with $\alpha,\beta$-unsaturated carboxylic compound, alkaline metal salt, and solvent to produce the resinate binder product. Said resinate binder may then be formulated with a colorant to produce an ink, preferably for use in publication gravure.

28 Claims, No Drawings

RESINATES FROM MONOMER

This application is a continuation of U.S. application Ser. No. 10/402,348, filed on Mar. 28, 2003, now U.S. Pat. No. 6,875,842 which claims benefit of provisional application No. 60/369,106, filed Mar. 28, 2002.

BACKGROUND OF THE INVENTION

1. Field of the Invention

The present invention relates to metal resinates, more specifically to resinates prepared from rosin and Monomer, and to the use of such resinates in inks and coatings, particularly inks for gravure printing.

2. Description of the Related Art

The use of rosin as a major component of the reactants used to prepared binders in printing inks is very well known in the art. Such rosin-based inks are used for a wide variety of printing processes, including flexography, gravure printing, letterpress printing, and lithography. Each printing process requires an ink with properties specific for optimal usage of that particular process, where relevant ink properties include viscosity, solvent evaporation, wettability, pigment dispersion, and compatibility with the other materials composing the ink press. In order to be able to use rosin in inks having such a diverse range of necessary performance properties, it is very important to select the appropriate materials that are reacted with the rosin to form the ink binder. See, e.g., Roger F. Burke, "Rosin-based Printing Inks," *Naval Stores*, Chapter 19, Pulp Chemicals Association (1989). Examples of rosin-based inks in the art are summarized below.

U.S. Pat. No. 5,708,078 (Bender et al., 1998) discloses a resin and the process of preparation thereof, where said resin is formed from natural resin and/or natural-resin acid, aldehyde and/or aldehyde acetal, polyhydric alcohol, and metal salt. Optionally, said resin may also comprise $\alpha,\beta$-unsaturated carboxylic compound, animal- or vegetable-derived fatty acid and/or fatty acid ester, and/or ethylenically unsaturated hydrocarbon resin. Among the objects of said invention are to provide a phenol-free ink composition, and to provide a binder resin imparting high ink gloss on printed material regardless of processing speed.

U.S. Pat. No. 5,698,668 (Bender, 1997) discloses modified natural-resin ester and the process of preparation thereof, wherein said resin ester comprises the reaction product of natural resin and/or natural-resin acid, $\alpha,\beta$-unsaturated carboxylic compound, polyoxophenol compound, aldehyde and/or aldehyde acetal, polyhydric alcohol, metal salt, and dicarboxylic compound not ethylenically unsaturated, optionally animal- or vegetable-derived fatty acid and/or fatty acid ester, optionally aromatic vinyl compound, and optionally polymer or oligomer of alkene. Among the objects of said invention are to provide a binder resin suitable for use in gravure printing of illustrations.

U.S. Pat. No. 5,082,497 (LeVine, 1992) discloses printing ink and rosin resinate compositions comprising the reaction product of rosin, $\alpha,\beta$-unsaturated carboxylic compound, metal salts of calcium or zinc and a Group I metal, and hydrocarbon solvent. An object of said invention is to provide improved resinates and gravure printing inks with the inclusion of a reactive Group I metal compound.

U.S. Pat. No. 4,301,055 (Schefbauer, 1981) discloses a calcium resinate and a printing ink composition containing said resinate, wherein said resinate comprises the reaction product of calcium hydroxide, rosin, reactive hydrocarbon resin, polyanhydride of $\alpha$-olefin-maleic anhydride, and optionally non-reactive hydrocarbon resin. Optionally, said rosin is tall oil, wood, gum, polymerized, and/or polycyclopentadiene-tall oil rosin. An object of said invention is to provide a high melting calcium resinate that will be soluble in hydrocarbon solvents typically employed in printing inks.

U.S. Pat. No. 4,244,866 (Schefbauer, 1981) discloses a printing ink comprising a resinate in a hydrocarbon solvent and a method of resinate preparation thereof, said resinate comprising the reaction product of rosin, calcium hydroxide, and polycarboxylic acid derived from maleic anhydride/$\alpha$-olefin copolymer. Optionally, the rosin used in the preparation of said binder is tall oil rosin. An object of said invention is to provide a high melting calcium resinate that will be soluble in hydrocarbon solvents typically employed in printing inks.

U.S. Pat. No. 4,079,102 (Wagner et al., 1978) discloses a printing ink composition comprising a binder comprising the reaction product of cycloaliphatic diene resin and olefinically unsaturated polycarboxylic acid, optionally an olefinically unsaturated monocarboxylic acid component selected from $C_{3-12}$ monocarboxylic acid and functional derivatives of said monocarboxylic acid, optionally a monohydric or polyhydric phenol component, and optionally a metal salt derived from a metal of Groups I-III of the Periodic Table. An object of said invention is to provide a binding agent suitable for use in gravure printing.

BRIEF SUMMARY OF THE INVENTION

The increasingly popular use of rosin in applications other than printing inks has increased competition for an essentially fixed amount of rosin, and increased the incentive to find alternatives to rosin for use in printing inks and binders therein. Therefore, an object of the present invention is to provide resinate binders for publication gravure that are equal or superior in performance to those in commerce today but at a substantially lower cost. The present invention recognizes that Monomer may be used in lieu of some of the rosin typically used in resinate production. This Monomer provides a lower cost alternative to rosin acids, and can surprisingly improve certain performance properties of the ink that incorporates the Monomer.

In one aspect, the present invention provides a resinate composition comprising the reaction product of rosin, Monomer, and alkaline metal salt wherein the cation of said salt is selected from Group IIA or Group IIB of the Periodic Table. The composition may optionally include an $\alpha,\beta$-unsaturated carboxylic compound, and/or an organic aromatic solvent, e.g., toluene, xylenes, and mixtures of aromatic solvents. In one aspect, the composition comprises the reaction product of about 5-85 wt % rosin, about 1-50 wt % Monomer, about 1-25 wt % $\alpha,\beta$-unsaturated carboxylic compound, about 1-15 wt % alkaline metal salt, and further includes up to about 80 wt % solvent. Exemplary suitable rosins include wood rosin, gum rosin, and tall oil rosin (TOR). Exemplary $\alpha,\beta$-unsaturated carboxylic compounds are maleic anhydride, fumaric acid, mono ($C_1$-$C_{12}$alkyl) ester of fumaric acid, di($C_1$-$C_{12}$alkyl) ester of fumaric acid, acrylic acid, $C_1$-$C_{12}$alkyl ester of acrylic acid, methacrylic acid, $C_1$-$C_{12}$alkyl ester of methacrylic acid, itaconic acid, and $C_1$-$C_{12}$alkyl ester of itaconic acid, while a preferred $\alpha,\beta$-unsaturated carboxylic compound is maleic anhydride. Exemplary metal cations of the alkaline metal salt are zinc, magnesium, and calcium. Exemplary anions of the alkaline metal salt are acetate, carbonate, bicarbonate, formate, hydroxide, oxalate and oxide. A preferred alkaline metal salt is selected from calcium oxide, calcium hydroxide, magnesium oxide, magnesium hydroxide, or a mixture thereof.

In one aspect, about 55-1% of the combined fatty acid and rosin acid equivalents are contributed by Monomer. In another aspect, about 35-10% of the combined fatty acid and rosin acid equivalents are contributed by Monomer. In another aspect, the acid equivalent ratio of rosin:Monomer in the reaction mixture used to form the resinate composition is about 0.5:1 to 15:1. In another aspect, the acid equivalent ratio of rosin:Monomer in the reaction mixture used to form the resinate composition is about 1:1 to 5:1. In one aspect, the composition further comprises water and an organic solvent selected from lower organic acid, hydrocarbon, or mixtures thereof. For example, in one aspect, the composition includes solvent where the solvent is composed of up to about 15 wt % water, up to about 15 wt % lower organic acid, and about 70-100 wt % hydrocarbon.

In a related aspect, the present invention provides a process for preparing a resinate composition. The process comprises: (a) melting rosin in a reaction vessel, optionally in admixture with Monomer; (b) further charging the reaction vessel with Monomer if Monomer is not already present in the reaction vessel; (c) further charging the reaction vessel with alkaline metal salt wherein the cation of said salt is selected from Group IIA or Group IIB of the Periodic Table, and optionally solvent, to provide a reaction mixture; (d) incubating the reaction mixture at elevated temperature to produce a reaction product; (e) heating the reaction product to evaporate excess solvent; and (f) cooling the reaction product (e) to yield a resinate composition. In one aspect, the composition comprises the reaction product of about 5-85 wt % rosin, about 1-50 wt % Monomer, about 1-25 wt % $\alpha,\beta$-unsaturated carboxylic compound, about 1-15 wt % alkaline metal salt, and optionally up to about 80 wt % solvent.

For example, the present invention provides a process comprising (a) melting the rosin in a reaction vessel at about 170° C., optionally in admixture with Monomer; (b) charging the reaction vessel with Monomer if Monomer is not already present in the reaction vessel, and optionally $\alpha,\beta$-unsaturated carboxylic compound; (c) heating the reaction mixture at about 225° C. for about 1 hour; (d) cooling the reaction mixture to less than about 100° C., preferably about 80-100° C.; (e) charging the reaction vessel with one or more of lower organic acid, water and hydrocarbon; (f) charging the reaction vessel with a slurry comprising hydrocarbon solvent, alkaline metal salt, and optionally tall oil fatty acid; (g) incubating the reaction mixture at less than about 100° C. for about 30 minutes; (h) heating the reaction mixture at about 115° C. for about 1-2 hours; and (i) cooling and discharging said reaction mixture. As another example, the present invention provides a process of preparing a resinate composition by a fusion method, in one aspect comprising the ordered steps of (a) melting the rosin in a reaction vessel at about 170° C., optionally in admixture with Monomer; (b) charging the reaction vessel with Monomer if Monomer is not already present in the reaction vessel, and optionally $\alpha,\beta$-unsaturated carboxylic compound; (c) heating the reaction mixture at about 200° C. for about 1 hour; (d) charging the reaction vessel with a slurry comprising hydrocarbon solvent, alkaline metal salt, and optionally tall oil fatty acid; (e) incubating the reaction mixture about 250° C. for about 90 minutes; (f) charging the reaction vessel with lower organic acid; and (g) further incubating the reaction mixture for about 1 hour before cooling and discharging the final reaction mixture. In one aspect, the composition comprises the fusion method reaction product of about 20-85 wt % rosin, about 1-50 wt % Monomer, about 1-25 wt % $\alpha,\beta$-unsaturated carboxylic compound, about 1-15 wt % alkaline metal salt, up to about 30 wt % hydrocarbon solvent, up to about 5 wt % lower organic acid, and optionally up to about 5 wt % water.

In one aspect, the present invention provides a modification of any resinate manufacturing process known in the art, the modification being that up to about 55 acid equivalent percent of the rosin is substituted with Monomer. In related aspects the present invention provides printing ink comprising pigment and the resinate binder as summarized above. The present invention also provides a process for preparing a printing ink that includes preparing a resinate binder as summarized above and then combining that resinate binder with a pigment. In preferred aspects, the printing ink is formulated for gravure printing. The present invention also provides varnishes that include the resinate binder as described above, where these varnishes may be combined with pigment to form a printing ink.

These and other aspects of this invention will become apparent upon reference to the following detailed description.

DETAILED DESCRIPTION OF THE INVENTION

The present invention provides for the preparation of a cost-effective resinate material for use in printing inks. It is well-known to those experienced in the art that natural rosins and rosin acids normally utilized in the production of printing inks are a relatively expensive component of the ink binder, and furthermore rosin is in increasingly short global supply. The present invention succeeds in finding a suitable replacement for some of this rosin as used in resinate production, and furthermore provides inks that have equal or superior performance properties to the inks that do not include the replacement found according to the present invention.

In one aspect, the present invention provides a composition for preparing a resinate, the composition comprising rosin, Monomer, and alkaline metal salt. Each of these components will now be described. Rosin is mainly a mixture of $C_{20}$, tricyclic fused-ring, monocarboxylic acids, typified by abietic acid. Individually, these monocarboxylic acids are commonly referred to as resin acids. Rosin can be obtained from many sources, and can have a wide range of purities. For example, wood rosin may be employed in the invention, where wood rosin is obtained from Pinus stumps after harvesting the stumps, chipping the stumps into small chips, extracting the chips with hexane or higher-boiling paraffins, and distilling the hexane or paraffin and fatty acids to yield wood rosin. Gum rosin, which is the name given to rosin that is obtained after scoring a pine tree, collecting the exudate sap, and then distilling away the volatile components and most of the fatty acids, may also be employed in the invention.

The Kraft wood pulping process, also known as the sulfate pulping process, produces tall oil as a byproduct of the paper-making process. According to this process, pinewood is digested with alkali and sulfide, producing tall oil soap and crude sulfate turpentine as by-products. Acidification of this soap followed by fractionation of the crude tall oil yields rosin and fatty acid as two of the major components. The rosin obtained by this process is known as tall oil rosin (TOR) and the fatty acid obtained by this process is known as tall oil fatty acid (TOFA). Rosin is typically characterized by its acid number, and rosins having acid numbers ranging from about 160 to about 180 are preferred according to the invention. Preferably, the tall oil rosin has undergone distillation so as to have less than about 5 weight percent tall oil fatty acids. A preferred rosin is available commercially from Arizona Chemical Company, Jacksonville, Fla., under the SYLVAROS® trademark. In various aspects, the resinate composition of the present invention comprises, or is prepared from reactants that comprise about 5-85 wt %, 15-85 wt %, 25-85 wt %, 35-85 wt %, 45-85 wt %, 55-85 wt %, 65-85 wt %, or 75-85 wt %; or about 5-75 wt %, 15-75 wt %, 25-75 wt %, 35-75 wt %, 45-75 wt %, 55-75 wt %, or 65-75 wt %; or about 5-65 wt %, 15-65 wt %, 25-65 wt %, 35-65 wt %, 45-65 wt %, or 55-65 wt %; or about 5-55 wt %, 15-55 wt %, 25-55 wt %, 35-55 wt %, or 45-55 wt %; or about 545 wt %, 1545 wt %, 2545 wt %, or 3545 wt %; or about 5-35 wt %, 15-35 wt %, or 25-35 wt %; or about 5-25 wt %, or 15-25 wt %; or about 5-15 wt % rosin. In preferred aspects of the present invention, the resinate composition comprises, or is prepared from reactants that comprise, 5-80 wt % rosin, more preferably 10-75 wt % rosin, even more preferably 15-70 wt % rosin. In one aspect, the rosin used in the resinate composition of the present invention is selected from the group consisting of tall oil rosin, gum rosin, and a combination thereof. In further various aspects, the rosin of the composition, or the rosin used to prepare the composition, comprises about 0-100 wt %, 10-100 wt %, 20-100 wt %, 30-100 wt %, or 35-100 wt %; or about 0-90 wt %, 10-90 wt %, 20-90 wt %, 30-90 wt %, or 35-90 wt %; or about 0-80 wt %, 10-80 wt %, 20-80 wt %, 30-80 wt %, or 35-80 wt %; or about 0-75 wt %, 10-75 wt %, 20-75 wt %, 30-75 wt %, or 35-75 wt %; or about 0-65 wt %, 10-65 wt %, 20-65 wt %, 30-65 wt %, or 35-65 wt % tall oil rosin, while in a preferred aspect the remainder of the rosin comprises gum rosin.

As mentioned previously, a co-product of rosin production is TOFA. TOFA is composed mainly of $C_{16-18}$ carboxylic acids, which are largely unsaturated in their acyl chain structure. Exemplary tall oil fatty acids include unsaturated acids such as oleic acid, oleic acid isomers, linoleic acid, and linoleic acid isomers, as well as small percentages of saturated fatty acid such as stearic acid. Due to its high content of unsaturated fatty acid, TOFA may be, and commonly is subjected to acidic clay catalyzed polymerization. In this polymerization process, which is typically conducted at high temperatures, the olefinic fatty acids undergo intermolecular addition reactions, by, e.g., the ene-reaction, so as to form polymerized fatty acid. The mechanism of this reaction is very complex and incompletely understood at the present time. However, for purposes of the present invention it will suffice to note that the product of this polymerization process comprises, in large part, dimerized fatty acid and a unique mixture of monomeric fatty acids. This polymerization product is commercially subjected to distillation in order to provide a fraction highly enriched in dimerized fatty acid, which is commonly known in the art as "dimer acid" or "dimer fatty acid". This distillation process will also provide a fraction that is highly enriched in the monomeric fatty acids, where this fraction is commonly known in the art as "monomer" or "monomer acid" or "monomer fatty acid", and will be referred to herein as Monomer.

Monomer is a unique composition. Whereas the natural source-derived TOFA largely consists of linear $C_{18}$ unsaturated carboxylic acids, principally oleic and linoleic acids, Monomer contains relatively small amounts of oleic and linoleic acids, and instead contains significant amounts of branched and cyclic C18 acids, both saturated and unsaturated, as well as elaidic acid. The more diverse and significantly branched composition of Monomer results from the thermal catalytic processing carried out on TOFA by the polymerization process just described. The art recognizes that the reaction of Monomer with other chemical substances yields unique, identifiable derivative substances that are chemically different from corresponding TOFA derivatives. Monomer has been assigned CAS Registry Number 68955-98-6. A suitable Monomer for the practice of the present invention is "MO6" as available from Arizona Chemical Company, Jacksonville, Fla.

As mentioned above, the present invention recognizes that some of the rosin normally present in a resinate composition may be replaced with Monomer. Surprisingly, the resulting resinate composition can perform at least adequately in a printing process. Even more surprisingly, some improvements in performance properties have been observed. For example, the Monomer-containing resinate compositions of the present invention have shown some improvement in the solvent release properties of the ink. In addition, the blocking properties of the printed substrate show some improvement when Monomer has been used to form the resinate composition.

In an alternative aspect of the present invention, some of the rosin used in a resinate-forming reaction is replaced with fatty acid, where that fatty acid is not necessarily Monomer. In various embodiments, 5-10%, or 11-15%, or 16-20%, or 21-25%, or 26-30%, or 31-35%, or 36-40%, or 41-45%, or 46-50% of the acid equivalents in a resinate-forming reaction are contributed by fatty acid, where that fatty acid is optionally Monomer or TOFA or a mixture thereof. While in preferred embodiments discussed extensively herein, the fatty acid is, or comprises, Monomer, in other embodiments the fatty acid is, or comprises TOFA. In another aspect, the fatty acid is, or comprises, vegetable-derived fatty acid. Thus, in one aspect of the present invention, the Monomer as described herein is replaced in whole or part with TOFA. For example, the present invention provides a resinate composition comprising the reaction product of reactants, the reactants comprising: (a) rosin; (b) TOFA; and (c) metal salt, the metal salt comprising a metal cation, the metal selected from Group IIA or Group IIB metals of the Periodic Table; where, in various embodiments, 5-10%, or 11-15%, or 16-20%, or 21-25%, or 26-30%, or 31-35%, or 36-40%, or 41-45%, or 45-50% of the acid equivalents attributed to acid-containing reactants are contributed by the TOFA.

However, in a preferred aspect of the present invention, a resinate is provided that is prepared from a mixture including rosin, preferably including tall oil rosin, and Monomer. In another aspect, up to about 55 acid % of the rosin in an otherwise standard resinate composition is replaced with Monomer. Thus, in various aspects, the present invention provides resinate compositions wherein about 55-1%, 50-1%, 45-1%, 40-1%, 35-1%, 30-1%, 25-1%, 20-1%, 15-1%, or 10-1%; or about 55-5%, 50-5%, 45-5%, 40-5%, 35-5%, 30-5%, 25-5%, 20-5%, 15-5%, or 10-5%; or about 55-10%, 50-10%, 45-10%, 40-10%, 35-10%, 30-10%, 25-10%, 20-10%, or 15-10%; or about 55-15%, 50-15%, 45-15%, 40-15%, 35-15%, 30-15%, 25-15%, or 20-15%; or about 55-20%, 50-20%, 45-20%, 40-20%, 35-20%, 30-20%, or 25-20%, of the combined rosin and fatty acid acid equivalents may be contributed by Monomer. In a preferred aspect, about 35-10% of the combined rosin and fatty acid acid equivalents are contributed by Monomer, because this amount provides a composition with satisfactory performance properties and relatively low cost. In the following discussion, an amount of 35-10% is typically disclosed, however other amounts as set forth above may also be used.

In other aspects of the present invention, the acid equivalent ratio of rosin:Monomer in the resinate composition may be about 0.5:1 to 15:1, 0.5:1 to 10:1, or 0.5:1 to 5:1; or about 0.75:1 to 15:1, 0.75:1 to 10:1, or 0.75:1 to 5:1; or about 1:1 to 15:1, 1:1 to 10:1, or 1:1 to 5:1. In a preferred aspect, the acid equivalent ratio of rosin:Monomer in the resinate composition is about 1:1 to 5:1, and this provides a composition with satisfactory performance and relatively low cost.

In another aspect, the resinate composition of the present invention comprises an alkaline metal salt. As used herein, the term "resinate" refers to a rosin, which is a carboxylic acid-containing material, in the form of a salt, i.e., a carboxylic acid salt. Also used herein, the term "alkaline metal salt" refers to an ionic compound containing a metal cation and an inorganic or lower organic anion, which compound tends to increase the alkalinity of the solution into which it is dissolved. Thus, in one aspect of the present invention, alkaline metal salt is combined with rosin and Monomer, which reacts with monocarboxylic acid moieties present in the acid components of the reaction mixture to produce metal carboxylate functionalities. Such treatment renders the resulting resinate composition readily soluble in organic solvent. In the present invention, the cation of the alkaline metal salt is preferably divalent (i.e., carries a charge of +2), more preferably selected from the elements of Group IIA or Group IIB or the Periodic Table (e.g., Be, Mg, Ca, Sr, Ba, Zn, or Cd). Rosin salts of divalent cations of zinc, magnesium, and calcium have particularly good pigment wetting properties, and are even more preferred in the resinates of the present invention. Most preferably, the cation of the alkaline metal salt is divalent calcium or magnesium cation. Said salts may be the acetate, carbonate, bicarbonate, formate, hydroxide, oxalate or oxide of a metal. Calcium and magnesium salts (including without limitation, calcium oxide, calcium hydroxide, magnesium oxide, and magnesium hydroxide) are further preferred. In one aspect of the present invention, the resinate composition comprises about 1-15 wt %, 2-15 wt %, or 3-15 wt %; or about 1-12 wt %, 2-12 wt %, or 3-12 wt %; or about 1-10 wt %, 2-10 wt %, or 3-10 wt % alkaline metal salt, preferably 3-10 wt % alkaline metal salt.

The resinate compositions of the present invention may also, but need not, contain one or more $\alpha,\beta$-unsaturated carboxyl compounds or esters thereof. An $\alpha,\beta$-unsaturated carboxyl compound has an olefinic unsaturation adjacent to the carbon atom of a carboxyl group, i.e., has the —C=C—C(=O)—O-arrangement of carbon and oxygen atoms. The $\alpha,\beta$-unsaturated carboxyl compound is reactive with rosin and tall oil pitch, to form an adduct therebetween. When the $\alpha,\beta$-unsaturated carboxyl compound is maleic anhydride, the adduct between rosin and maleic acid is known as maleated rosin. When the $\alpha,\beta$-unsaturated carboxyl compound is fumaric acid, or an ester of fumaric acid, then the corresponding adduct formed between rosin and fumaric acid or a fumarate is known as fumarated rosin. When the $\alpha,\beta$-unsaturated carboxyl compound reacts with tall oil pitch, the reaction product is known as maleated pitch (when maleic anhydride is the $\alpha,\beta$-unsaturated carboxyl compound) or fumarated pitch (when fumaric acid or an ester thereof is the $\alpha,\beta$-unsaturated carboxyl compound).

Suitable $\alpha,\beta$-unsaturated carboxylic compounds include maleic anhydride, fumaric acid, mono ($C_1$-$C_{12}$alkyl) ester of fumaric acid, di($C_1$-$C_{12}$alkyl) ester of fumaric acid, acrylic acid, $C_1$-$C_{12}$alkyl ester of acrylic acid, methacrylic acid, $C_1$-$C_{12}$alkyl ester of methacrylic acid, itaconic acid, and $C_1$-$C_{12}$alkyl ester of itaconic acid. Maleic anhydride, fumaric acid and esters of fumaric acid are preferred $\alpha,\beta$-unsaturated carboxylic compounds, with maleic anhydride being most preferred. In various aspects of the present invention, the resinate composition comprises about 1-25 wt %, 2-25 wt %, or 3-25 wt %; or about 1-20 wt %, 2-20 wt %, or 3-20 wt %; or about 1-15 wt %, 2-15 wt %, or 3-15 wt % maleic anhydride, preferably 3-15 wt % maleic anhydride.

The resinate compositions of the present invention may also, but need not, contain TOFA. In various aspects, the resinate composition of the invention comprises about 0.01-2 wt %, 0.01-1.5 wt %, 0.01-1 wt %, or 0.01-0.5 wt %; or about 0.02-2 wt %, 0.02-1.5 wt %, 0.02-1 wt %, or 0.02-0.5 wt %; or about 0.03-2 wt %, 0.03-1.5 wt %, 0.03-1 wt %, or 0.03-0.5 wt % tall oil fatty acid, preferably 0.02-1 wt % tall oil fatty acid, more preferably 0.03-0.5 wt % tall oil fatty acid. The fatty acid is primarily used to disperse alkaline metal salts in solvent. Fatty acids other than TOFA, for example the fatty acids present in Monomer, can be used for this same purpose.

The resinate compositions of the present invention may also, but need not, contain phenolic compound(s). Phenolic compounds suitable for use as a component of the resin-forming composition of the invention include, without limitation, phenol, $C_{1-12}$ alkylphenols, arylphenols, aralkylphenols, cresols, 1,3,5-xylenols, diphenylolpropane, cumylphenol, and the like. As used herein, alkyl refers to a hydrocarbon structural domain containing exclusively C—C and C—H single bonds; aryl refers to a hydrocarbon structural domain as an aromatic ring system; while aralkyl refers to a hydrocarbon structural domain containing both aromatic and alkyl moieties. In various aspects of the present invention, phenolic compound is 0-50%, 0-40%, or 0-30% of the total weight of the resinate-forming components, and is preferably 0-25% of the total weight of the resinate-forming components. In additional aspects of the invention, for each of these percentage ranges, phenol may constitute 0-100% of the phenolic compound.

The resinate compositions of the present invention may also, but need not, contain aldehyde. The aldehyde of the present invention is reactive with rosin and phenol, to produce crosslinked resinous adducts. Exemplary aldehydes of the present invention include, without limitation, formaldehyde, paraformaldehyde, acetaldehyde, glyceraldehyde, butyraldehyde, isobutyraldehyde, benzaldehyde, furfural, and glyoxal. In various aspects of the present invention, aldehyde is 0-40%, 0-30%, or 0-20% of the total weight of the components used to form the resinate composition of the present invention, and is preferably 0-15% of the total weight of the resinate-forming components. Paraformaldehyde is a preferred aldehyde to be used as a resin-forming component, and the term "formaldehyde" is used herein to include both formaldehyde and paraformaldehyde.

In an optional aspect, the phenolic compound is pre-reacted with the aldehyde, so as to provide a so-called phenolic resin. Thus, phenolic compound and aldehyde may be added to the resin-forming reaction mixture in the form of a phenolic resin, rather than, or in addition to, the two individual reactants.

The resinate compositions of the present invention may also, but need not, contain polyhydric alcohol. Polyhydric alcohols of the present invention are reactive with acidic moieties via standard esterification reactions, and are reactive with ester moieties via standard transesterification reactions, to produce crosslinked resinous adducts. Exemplary polyols include, without limitation, alkylene glycol (such as ethylene glycol and propylene glycol), polyalkylene glycol (such as polyethylene glycol and polypropylene glycol), alkylene triol (such as glycerol, trimethylolethane, and trimethylolpropane), tetrafunctional alcohols such as pentaerythritol, pentafunctional alcohols such as dimerized trimethylolpropane, or hexafunctional alcohols such as dimerized pentaerythritol, where a preferred polyol of the present invention is pentaerythritol. In various aspects of the present invention, polyhydric alcohol is 0-25%, 0-20%, or 0-15% of the total weight of the components used to form the resinate composition of the present invention, and is preferably 0-15% of the total weight of the resinate-forming components.

In another aspect, the resinate composition of the present invention comprises solvent. The solvent is not, however, a resin-forming reactant or component. In other words, while the solvent may be part of the composition, the solvent is not considered to be a reactant. The weight percent values provided herein that describe reactant amounts do not consider whether any solvent is present, i.e., these weight percent values are based on the total weight of the reactants. However, when discussing the composition of the invention, which may include resinate and solvent, weight percent values based on the total weight of the composition may be provided herein when discussing the weight of solvent and/or the weight of resinate in the composition.

The solvent is composed of one or more solid or liquid components. In a preferred aspect, the solvent of the composition of the present invention is composed only of liquid components; more preferably, the solvent comprises more than one liquid component. A preferred aspect of the composition of the present invention is one wherein the solvent is comprised of at least one organic compound, wherein the term "organic" as used herein refers to a compound having a molecular structure containing at least one carbon atom. Conversely, an inorganic compound is one having a molecular structure containing no carbon atoms. According to one aspect of the present invention, said organic compound(s) is(are) preferably free of hydroxyl, aldehyde, alkenyl, cycloalkenyl, and nitrogen-containing groups. As used herein, alkenyl refers to a hydrocarbon structural domain containing at least one C═C double bond, while cycloalkenyl refers to an alkenyl structural domain configured in a cyclic orientation. Though it is typical in the art to include alcohol and aldehyde-containing compounds in the reaction mixtures of resins and resinates (e.g., optionally-substituted phenols and formaldehyde), certain of these compounds may be hazardous to humans upon exposure in large quantities, such as may be encountered during the process of manufacture. Therefore, in one aspect, the present invention provides for compositions that avoid use of these hazardous materials. In a preferred aspect, the resinate composition of the present invention comprises up to about 80 wt %, more preferably up to about 70 wt %, even more preferably up to about 60 wt %, solvent.

Exemplary organic solvent components according to the present invention include lower organic acid (exemplified by, without limitation, acetic acid) and hydrocarbons, wherein said hydrocarbons may be alkyl, aryl, or aralkyl. In a preferred aspect, the hydrocarbon of the solvent of the present invention is selected from the group consisting of xylene and toluene. In a further preferred aspect, the solvent of the present invention is selected from the group consisting of lower organic acid, hydrocarbon, water, and mixtures thereof, preferably a composition consisting of about 70-100 wt % hydrocarbon, up to about 15 wt % lower organic acid, and optionally up to about 15 wt % water.

The present invention also provides a process for preparing a resinate composition, where the process comprises forming a fluid mixture comprising rosin, Monomer, alkaline metal salt, solvent, and any optional components such as $\alpha,\beta$-unsaturated carboxylic compound; reacting together the components of this mixture to produce a reaction product; optionally heating the reaction product to evaporate excess solvent; and cooling the reaction product to yield a resinate composition. The rosin, Monomer, alkaline metal salt, solvent, and any optional components may be added together in any order. In a preferred process, the rosin is melted and then the other components are added to the molten rosin; however in one aspect, phenol compound may be charged to the reaction vessel before or during rosin melting. In another preferred aspect, the rosin and Monomer are added to a reaction vessel and these two components are heated to achieve a homogeneous molten state.

As used herein, the term "reacting together" means that each of the required and optional components is added to a reaction vessel under reaction conditions such that each component reacts with either a) another component, or b) a reaction product formed from two or more other reaction components. In order for the components to undergo a resinate-forming reaction, combinations of the components must be exposed to an elevated temperature in the range of 80-300° C. At these elevated temperatures, the components undergo covalent and ionic bond-forming reactions with other components, so that some increased molecular weight material is formed.

For example, each of the components may be combined in a single reaction vessel, and the combination taken to elevated temperature so that the components react with one another to form a resinate of the invention. This approach may be termed a "one-pot" reaction process. Alternatively, two or more (but less than all) components may be combined in a single reaction vessel, and this combination taken to elevated temperature so that the components react with one another to form an intermediate reaction product. Then other components are reacted with the intermediate reaction product. For example, in the present invention the rosin and Monomer may be combined and heated, a process by which the rosin component will melt. The resulting reaction mixture can then be combined with the other reaction components (in this invention, alkaline metal salt, solvent, and optional components such as tall oil fatty acid and $\alpha,\beta$-unsaturated carboxylic compound). Preferably the rosin and Monomer are combined prior to introduction of alkaline metal salt, to help maximize the formation of carboxylate functionalities in the resinate composition. The combination is then taken to elevated temperature, typically between 50° C. and 300° C., preferably 80° C. to 250° C., under either normal (atmospheric) pressure or elevated pressure as may be achieved in, e.g., an autoclave.

The present invention also provides that after reacting together components in a reaction mixture, an additional amount of one or more of said components may be added to the reaction mixture and further reacted together. This is commonly done in commercial resinate production, and is illustrated in the Examples provided herein. It should be recognized that the same components (in terms of quantity and identity) may form resinates with different properties, depending on the precise manner in which the components are reacted together. However, determining these properties is well within the skill of the ordinary artisan.

The reaction temperature(s) is selected with the following points in mind. The reaction temperature must be high enough that the contents of the reaction vessel are sufficiently fluid to allow those contents to be stirred. Higher temperatures are generally preferred for reasons of economy, in order to provide a faster rate of reaction. However, the reaction temperature should not be so great that the reaction components boil out of the reaction vessel. Nor should the temperature be so great that decomposition of the reaction components or reaction products should occur.

The resinate-forming reaction generates water as a byproduct of the bonds that are formed between members of the reaction components. In order to drive the reaction toward completion, this water should be removed from the reaction or product mixture. In the absence of vacuum or azeotrope formation, a reaction temperature of at least 100° C. is needed in order to distill water away from the reacting components. Thus, at least during the initial stage(s) of resinate formation, the reaction temperature is desirably set to about 100-125° C. While a higher initial reaction temperature may be used, the consequence may be water generation at a rate that is much greater than water removal may be conveniently accomplished.

In order to drive the reaction to completion, removal of water may be enhanced through addition of an organic solvent that forms a low-boiling azeotrope with water, and/or the addition of a light vacuum on the reaction vessel. To provide a low-boiling azeotrope, an organic solvent that forms an azeotrope with water, e.g., toluene or xylene, can be added to the reaction vessel, and then removed by distillation, under normal pressure. If the final product form is a solution, the same solvent is the azeotroping agent.

The reaction components are maintained at about 100-300° C. until the reaction is considered finished. Reaction progress is conveniently monitored by periodically taking samples of the reaction mixture and measuring one or more relevant properties of the sample. For example, initially the acid number of the reaction mixture may be as high as about 300. The acid number will gradually fall as the resinate-forming reaction proceeds. Melting point (softening point), melt viscosity, and/or solution viscosity measurements may also be made to monitor reaction progress.

In one preferred embodiment of the present invention, the process for preparing a resinate composition comprises the ordered steps of: (a) melting the rosin in a reaction vessel at about 170° C., optionally in admixture with Monomer; (b) charging the reaction vessel with Monomer if Monomer is not already present in the reaction vessel, and optionally α,β-unsaturated carboxylic compound; (c) heating the reaction mixture at about 225° C. for about 1 hour; (d) cooling the reaction mixture to less than about 100° C.; (e) charging the reaction vessel with one or more of lower organic acid, water and hydrocarbon; (f) charging the reaction vessel with a slurry comprising hydrocarbon solvent, alkaline metal salt, and optionally tall oil fatty acid; (g) incubating the reaction mixture at less than about 100° C. for about 30 minutes; and (h) heating the reaction mixture at about 115° C. for about 1-2 hours before cooling and discharging the reaction product. In utilizing this process, the resulting resinate composition preferably comprises about 20-80 wt % hydrocarbon solvent, more preferably about 30-70 wt % hydrocarbon solvent, and even more preferably about 40-60 wt % hydrocarbon solvent.

In another embodiment of the present invention, the resinate composition of the present invention is prepared by a process referred to as the "fusion method". Explained briefly, a fusion method is a dry preparation process whereby components are combined in the absence of solvent, the reaction mixture is rendered molten and given time to react, and the mixture is then cooled to yield a resinate product that is essentially water-free and solvent-free. In a method variation, the reaction mixture further comprises a small quantity of a hydrocarbon solvent, preferably toluene or xylene, in order to remove water from the mixture upon heating, via azeotropic distillation. Thus, with the fusion method of resinate preparation, much less hydrocarbon solvent is used in comparison to other known methods of resinate preparation, allowing the skilled artisan to prepare resinate without the added reaction volumes, cost, and exposure hazards associated with solvent use.

In a preferred embodiment, the process for preparing a resinate composition comprises the ordered steps of: (a) melting the rosin in a reaction vessel at about 170° C., optionally in admixture with Monomer; (b) charging the reaction vessel with Monomer if Monomer is not already present in the reaction vessel; (c) heating the reaction mixture at about 200° C. for about 1 hour; (d) charging the reaction vessel with a slurry comprising hydrocarbon solvent and alkaline metal salt; (e) incubating the reaction mixture about 250° C. for about 90 minutes; (f) charging the reaction vessel with lower organic acid; and (g) further incubating the reaction mixture for about 1 hour before cooling and discharging the final reaction product. In utilizing this process, the resinate composition preferably comprises up to about 30 wt % hydrocarbon solvent, more preferably up to about 25 wt % hydrocarbon solvent, and even more preferably up to about 20 wt % hydrocarbon solvent. In various other aspects of this process, α,β-unsaturated carboxylic compound may be added to the reaction mixture after rosin melting and prior to heating; tall oil fatty acid may be included as part of the slurry; phenolic compound may be charged to the reaction vessel before or during the rosin melting; aldehyde may be added to the reaction mixture after rosin melting and prior to heating; or polyhydric alcohol may be added to the reaction mixture after rosin melting and prior to cooling and discharge.

The resinates of the present invention may be characterized by their properties, which include acid number, melting point, viscosity, and dilutability in toluene. These properties are routinely measured for such resins and resinates, and thus one of ordinary skill in the art is very familiar with techniques to measure these properties. Nevertheless, a brief description of techniques to measure certain of these properties is provided here.

Acid number is measured by dissolving a known weight of resin or resinate into an organic solvent (toluene is a typical solvent), and then titrating a measured amount of methanolic potassium hydroxide (KOH) solution into the resin or resinate solution. The titration is complete when a pH of about 7 is attained. The acid number of the resin or resinate is equal to the amount of KOH, in mg, which was used in the titration, divided by the weight of resin or resinate, in grams, in the sample that was titrated. In other words, acid number is equal to the mg of KOH needed to neutralize 1 gram of sample.

Melting point, which may also be referred to as "softening point," may be measured by the so-called "ring and ball" method, which is the subject of ASTM E28. Alternatively, a softening point value may be obtained using a Mettler FP80 Central Processor and a Mettler FP83 HT Dropping Point Cell employing a softening point ring. This apparatus is available from Mettler Laboratories (Hightstown, N.J.). The melting point values described and reported herein were obtained using either a Mettler FP83HT apparatus or a ring and ball apparatus.

Viscosity is measured on resin or resinate solutions using Gardner viscosity tubes compared to reference standards. In this test (hereinafter referred to as the "Gardner Holdt Bubble method") a resin solution is poured into a tube of standard (10.65 mm) internal diameter leaving a standard volume of air at the top of the tube. The tube is corked and placed in a water bath at 25° C. Tubes filled with silicone oil based standard of known viscosity are placed in a rack next to the tube with the resin solution of unknown viscosity. The tubes are inverted and the viscosity is determined relative to standard by comparing the rate of rise of the bubbles created by the air space at top of the tubes. This so-called "bubble rise time" viscosity is reported by comparison to standards. The standards range from low viscosity to high viscosity as follows: A3, A2, A1, A through Z, Z1 through Z10. If the bubble of the unknown is between two of the reference standards it is reported as such. For example if the bubble of the unknown sample rises at a rate between the Z and Z1 tube, the viscosity is reported as Z-Z1.

Viscosity may also be measured using a Physica Viscolab LC3 viscometer, according to the method of ISO 3219 ("Plastics, polymers, resiris in the liquid state or as emulsions of dispersions—Determination of viscosity using a rotational viscometer with defined shear rate"). Measurements obtained by this method are typically reported in units of mPa·s. This viscometer is available from Physica Messtechnik GmbH, Stuttgart, Germany (www.physica.de).

Toluene dilution is measured by weighing a known quantity of resinate solution and diluting it with toluene until print viscosity is achieved. Print viscosity is determined using a flow or efflux cup available from a number of manufacturers and standards organizations. Typical cups used include the Shell #2 and DIN 3 mm cups, which both are designed to yield the viscosity of press ready ink at a particular flow time. The known quantity of resinate solution is diluted to a standard flow time (e.g., 18 seconds on a Shell #2 cup or 25 seconds on a 3 mm DIN cup) at a standard temperature (typically 21° C. or 25° C.) and the amount of toluene is recorded in either mLs or grams per sample size used. For example, if 75 mLs of toluene was required to reduce the viscosity of 100 grams of resinate solution to achieve a flow rate of 18 seconds on a Shell # 2 cup at 25° C., the toluene dilution would be reported as 75 mLs toluene required to achieve print viscosity on a Shell #2 cup.

The present invention also provides an ink suitable for printing, preferably gravure printing. In gravure printing, a cylinder onto which is engraved or etched the image to be printed is rolled directly into ink and transferred directly to the substrate that accepts the printed image. This is in contrast to other forms of printing wherein ink is transferred by rolling onto one or several additional cylinders before transferring ink onto the substrate. Gravure printing is very common commercial mode of printing, and is well known to one of ordinary skill in the art. Gravure printing is often used in printing on substrates such as magazine stock, metal foils, plastic films, and paper cartons.

A gravure ink of the present invention contains a resinate as disclosed herein, in addition to a solvent, a colorant and optional performance-enhancing additives. The inventive resinate can be used alone or in combination with co-resins. Suitable co-resins include commonly known co-resins such as, without limitation, rosin modified maleic and phenolic esters, and hydrocarbon resins. Owing to the lack of intermediary rollers and/or cylinders utilized in gravure printing, the ink used in gravure printing must be of very low viscosity and finely ground so as to reduce the amount of scratching imparted to the engraved or etched cylinder; yet, because of the relative absence of solvent-sensitive (i.e., rubber-composed) moving parts needed for said printing process, a wide range of solvents are acceptable for use in gravure printing. Suitable solvents include, without limitation, mineral oils, aromatic and ester solvents. Suitable colorants include flushed color, dry pigments and soluble dyes. Additives can include, without limitation, waxes, wetting agents, and plasticizers. In addition to the materials noted above, the ink additionally may contain any number of optional components, where the optional component(s) provide for improvements in the performance of the ink. Ink performance properties include color strength, gloss, scuff resistance, block resistance, misting, open time on press and many other properties.

Printing ink may be prepared by adding colorant (flush color, dry pigment or soluble dyes), additives and additional solvent to a letdown varnish comprising a resinate composition of the present invention. Flush color is a form of pigment where the solvent used during the pigment manufacturing process (water) has been replaced by a hydrocarbon or oil based varnish. Such a varnish can contain the inventive or conventional resins, resinates, or a combination of both. Finished ink may be prepared by adding the flush color and the letdown varnish while mixing at low shear. The mixture can be passed through a bead mill or shot mill to further reduce pigment particle size and improve final ink properties. Soluble dyes can be added with little or no additional energy to impart color to the system. Additional varnish or solvent can be added to adjust tack, flow and viscosity to reach target specifications and then additives are blended in.

One of ordinary skill in the art is familiar with preparing printing inks using either flush color, dry pigment or soluble dyes and may adopt other procedures for preparing such a printing ink.

The invention is illustrated in more detail by the following examples. In the following examples, chemicals were of reagent grade unless noted otherwise, and were obtained from commercial supply houses such as Aldrich Chemical Co. (Milwaukee, Wis.). MERIGRAL™ HV modified resinate was obtained from DRT (DAX Cedex, France). SYLVAROS™ 85 tall oil rosin, SYLVAROS™ NCY tall oil rosin, and SYLVAPRINT™ GS62126 T37 resinate were obtained from Arizona Chemical (Jacksonville, Fla.). MO6 monomer fatty acid is Monomer as obtained from Arizona Chemical (Jacksonville, Fla.). HRJ 1367 para-tert-butylphenol/formaldehyde phenolic resin was obtained by Schenectady International (Schenectady, N.Y.). Comparative examples are denoted by the example number followed by the letter "C".

EXAMPLES

Example 1

Solution Resinate with 30 Percent of Acid from Monomer

A reaction vessel was charged with tall oil rosin, and said rosin was melted at 170° C. Then, said reaction vessel was further charged with MO6 fatty acid monomer and maleic anhydride, and heated at 225° C. for 60 min. The resulting adduct was cooled to 160° C., before further charging said reaction vessel with toluene. The mixture temperature was adjusted to 92° C., before further charging said reaction vessel with acetic acid and water, followed by a slurry of toluene, tall oil fatty acid and calcium hydroxide. The mixture was held at 92° C. for 30 minutes, then heated to about 100° C. until nearly all water had been distilled from the reaction mixture. Percent composition (by mass) of the total reaction mixture is indicated in Table 1.

Following removal of water from the reaction mixture, viscosity and solids were measured and the mixture was cooled and discharged. The resulting resinate could then be used in dispersion of pigments or in the letting down of concentrated pigment pastes.

TABLE 1

| Component | Mass percent of total mixture |
|---|---|
| Tall oil rosin | 22.57 |
| MO6 fatty acid monomer | 9.67 |
| Maleic anhydride | 2.77 |
| Toluene | 52.65 |
| Water | 0.12 |
| Calcium hydroxide | 4.09 |
| Toluene (in slurry) | 7.98 |
| Tall oil fatty acid | 0.05 |
| Acetic acid | 0.10 |

Example 2

Solution Resinate with 10 Percent of Acid from Monomer

A reaction vessel was charged with tall oil rosin and MO6 fatty acid monomer at ambient temperature, and said mixture was melted by raising its temperature to 170° C. Then, said reaction vessel was further charged with maleic anhydride, and the temperature was raised to 225° C. Said mixture was kept at 225° C. for 60 min, after which the mixture was cooled to about 160° C. The reaction vessel was charged with toluene, and the mixture temperature was adjusted to about 92° C. The reaction vessel was further charged with acetic acid and water, followed by a slurry of toluene, tall oil fatty acid and calcium hydroxide. The mixture was held at 92° C. for 30 minutes, and the mixture viscosity was determined to be 'Z5' (by the Gardner Holdt Bubble method), while the solids content of the mixture was 34.5%. The mixture was then dehydrated by heating to 115° C. for about 70 min. Percent composition (by mass) of the total reaction mixture is indicated in Table 2.

TABLE 2

| Component | Mass percent of total mixture |
|---|---|
| Tall oil rosin | 27.88 |
| MO6 fatty acid monomer | 3.10 |
| Maleic anhydride | 2.66 |
| Toluene | 52.36 |
| Water | 0.12 |
| Calcium hydroxide (97% in water) | 4.80 |
| Toluene (in slurry) | 8.95 |
| Tall oil fatty acid | 0.05 |
| Acetic acid (85% in water) | 0.10 |
| Weight of total mixture: | 1146 grams |

Example 3

Solution Resinate with 30 Percent of Acid from Monomer

A reaction vessel was charged with tall oil rosin and MO6 fatty acid monomer at ambient temperature, and said mixture was melted by raising its temperature to 170° C. The reaction vessel was then charged with maleic anhydride, and the temperature was raised to 225° C. Said mixture was kept at 225° C. for 60 min, after which the mixture was cooled to about 150° C. The reaction vessel was charged with toluene, and the mixture temperature was adjusted to about 92° C. The reaction vessel was charged with acetic acid and water, followed by a slurry of toluene, tall oil fatty acid and calcium hydroxide. The mixture was held at 92° C. for 30 minutes, and the mixture viscosity was determined to be A1 (by the Gardner Holdt Bubble method). The reaction vessel was then further charged with 3 grams calcium hydroxide (as a 40% solution in toluene). The mixture was held at 92° C. for 30 minutes, and the mixture viscosity was determined to be U (by the Gardner Holdt Bubble method). The mixture was then dehydrated by heating to about 115° C. for about 2 h. Following dehydration, the mixture viscosity was determined to be F+ (by the Gardner Holdt Bubble method), while the solids content of the mixture was 37.38%. The mixture was cooled to 50° C. and discharged. Percent composition (by mass) of the total reaction mixture (prior to the supplementary charging of calcium hydroxide) is indicated in Table 3.

TABLE 3

| Component | Mass percent of total mixture |
|---|---|
| Tall oil rosin | 22.37 |
| MO6 fatty acid monomer | 9.59 |
| Maleic anhydride | 2.74 |
| Toluene | 52.21 |
| Water | 0.12 |
| Calcium hydroxide (97% in water) | 4.41 |
| Toluene (in slurry) | 8.42 |
| Tall oil fatty acid | 0.05 |
| Acetic acid (85% in water) | 0.10 |
| Weight of total mixture: | 2500 grams |

Example 4

Solution Resinate with 30 Percent of Acid from Monomer

A reaction vessel was charged with tall oil rosin and MO6 fatty acid monomer at ambient temperature, and said mixture was melted by raising its temperature to 170° C. The reaction vessel was charged with maleic anhydride, and the temperature was raised to 225° C. Said mixture was kept at 225° C. for 60 min, after which the mixture was cooled to 160° C. The reaction vessel was charged with toluene, and the mixture temperature was cooled to 92° C. The reaction vessel was charged with acetic acid and water, followed by a slurry of toluene, tall oil fatty acid and calcium hydroxide. The mixture was held at 92° C. for 30 minutes, and the mixture viscosity was determined to be B or C (by the Gardner Holdt Bubble method), while the solids content of the mixture was 51.50%. The reaction vessel was charged with 6 grams calcium hydroxide, the mixture was held at 92° C. for 30 minutes, and the mixture viscosity was determined to be D (by the Gardner Holdt Bubble method), while the solids content of the mixture was 52.58%. The reaction vessel was charged with 4 grams calcium hydroxide, the mixture was held at 92° C. for 25 minutes, and the mixture viscosity was determined to be F (by the Gardner Holdt Bubble method), while the solids content of the mixture was 52.73%. The reaction vessel was charged with 2 grams calcium hydroxide, the mixture was further held at 92° C. for 30 minutes, and the mixture viscosity was determined to be I or J (by the Gardner Holdt Bubble method). The reaction vessel was then further charged with 3 grams calcium hydroxide, the mixture was further held at 92° C. for 30 minutes, and the mixture viscosity was determined to be U—(by the Gardner Holdt Bubble method). The mixture was dehydrated by heating to about 115° C. for about 100 min. Following dehydration, the mixture viscosity was determined to be Q—(by the Gardner Holdt Bubble method), while the solids content of the mixture was 54.02%. The mixture was cooled and discharged, and the final mixture viscosity was determined to be Q—(by the Gardner Holdt Bubble method), while the solids content of the final mixture was 54.30%. Percent composition (by mass) of the total reaction mixture (prior to the supplementary charging of calcium hydroxide) is indicated in Table 4.

TABLE 4

| Component | Mass percent of total mixture |
|---|---|
| Tall oil rosin | 35.57 |
| MO6 fatty acid monomer | 15.24 |
| Maleic anhydride | 1.51 |
| Toluene | 33.12 |
| Water | 0.10 |
| Calcium hydroxide (97% in water) | 5.12 |
| Toluene (in slurry) | 9.19 |
| Tall oil fatty acid | 0.08 |
| Acetic acid (85% in water)) | 0.08 |
| Weight of total mixture: | 1992.66 grams |

Comparative Example 5C

Solution Resinate Depleted in Fatty Acid Monomer

A reaction mixture was prepared in a manner similar to that described in Example 1, with the omission of MO6 fatty acid monomer. Following dehydration, the solids content of the mixture was 36.99%. Percent composition (by mass) of the total reaction mixture is indicated in Table 5.

TABLE 5

| Component | Mass percent of total mixture |
|---|---|
| Tall oil rosin | 31 |
| Maleic anhydride | 2.2 |
| Toluene | 56 |
| Water | 0.1 |
| Calcium hydroxide (97% in water) | 4 |
| Toluene (in slurry) | 5.7 |
| Tall oil fatty acid | 0.05 |
| Weight of total mixture: | 3,000 grams |
| Percent yield: | 97.87 |

Examples 6-10

Properties of Varnish Containing Fatty Acid Monomer

In these examples, varnish samples comprising resinate containing up to 30% of acid as MO6 fatty acid monomer were analyzed for viscosity and solid content, and the properties of these samples were compared to those of varnish samples comprising resinate devoid of MO6 fatty acid monomer. Test findings are summarized in Table 6.

TABLE 6

| Ex. | Resinate sample | Percent of acid as MO6 fatty acid monomer | Percent as solids | Viscosity (mPa · s) |
|---|---|---|---|---|
| 6 | MERIGRAL ™ HV | 0 | 36.28 | 535.4 |
| 7 | 0% MO6 | 0 | 37.09 | 103.5 |
| 8 | 10% MO6 | 10 | 36.32 | 235.8 |
| 9 | 30% MO6 | 30 | 34.52 | 526.7 |
| 10 | SYLVAPRINT ™ GS62126 T37 | 0 | 36.12 | 217.4 |

Examples 11-15

Properties of Varnish at Constant Viscosity

In these examples, varnish samples comprising resinate containing up to 30% of acid as MO6 fatty acid mommomer, were each adjusted to 1 dPa·s viscosity, and analyzed for various properties. The properties compared to those of varnish samples devoid of MO6 fatty acid monomer. Test findings are summarized in Table 7.

TABLE 7

| Ex. | Resinate sample | Percent of acid as MO6 fatty acid monomer | Viscosity (dPa · s) | Percent as solids | Blocking Stals (min) | Fingertip drying time (s) |
|---|---|---|---|---|---|---|
| 11 | MERIGRAL ™ HV | 0 | 1 | 31.14 | 15-18 | 29 |
| 12 | 0% MO6 | 0 | 1 | 34.43 | 15-18 | 29 |
| 13 | 10% MO6 | 10 | 1 | 32.76 | 15-18 | 29 |
| 14 | 30% MO6 | 30 | 1 | 29.37 | 6-9 | 30 |
| 15 | SYLVAPRINT ™ GS62126 T37 | 0 | 1 | 33.64 | 12-15 | 26 |

Examples 16-20

Diluting Curves of Varnish Containing Fatty Acid Monomer

In these examples, varnish samples comprising resinate containing up to 30% of acid as MO6 fatty acid monomer were analyzed for viscosity using a flow cup (recorded in seconds) as a function of solids content, compared to varnish samples devoid of MO6 fatty acid monomer. Test findings are summarized in Table 8.

TABLE 8

| | | DILUTION TIMES (s) | | | | | | | | | |
|---|---|---|---|---|---|---|---|---|---|---|---|
| | Percent of acid as MO6 fatty acid | Solid in toluene (wt %) | | | | | | | | | |
| Ex. Resinate sample | monomer | 36 | 34 | 32 | 30 | 28 | 26 | 24 | 22 | 20 | 18 |
| 16 MERIGRAL ™ HV | 0 | 466 | 198 | 105 | 54 | 34 | 27 | 23 | 22 | — | — |
| 17 0% MO6 | 0 | 200 | 89 | 51 | 37 | 30 | 26 | 24 | 23 | — | — |
| 18 10% MO6 | 10 | — | 406 | 159 | 84 | 50 | 36 | 29 | 25 | 23 | 22 |
| 19 30% MO6 | 30 | 103 | 58 | 40 | 31 | 27 | 25 | 23 | 22 | — | — |
| 20 SYLVAPRINT ™ GS62126 T37 | 0 | 196 | 80 | 42 | 30 | 25 | 23 | 22 | — | — | — |

Examples 21-25
Solvent Retention of Varnish Containing Fatty Acid Monomer

In these examples, varnish samples comprising resinate containing up to 30% of acid as MO6 fatty acid monomer were analyzed for solvent retention as a function of time, compared to varnish samples devoid of MO6 fatty acid monomer. Test findings are summarized in Table 9.

TABLE 9

| | | Percent of acid as MO6 fatty acid | Solvent retention (%) | | | |
|---|---|---|---|---|---|---|
| Ex. | Resinate sample | monomer | After 2 h | After 4 h | After 7 h | Average |
| 21 | MERIGRAL ™ HV | 0 | 9.73 | 8.96 | 8.51 | 9.07 |
| 22 | 0% MO6 | 0 | 7.09 | 6.18 | 5.52 | 6.26 |
| 23 | 10% MO6 | 10 | 7.04 | 5.60 | 4.23 | 5.62 |

TABLE 9-continued

| | | Percent of acid as MO6 fatty acid | Solvent retention (%) | | | |
|---|---|---|---|---|---|---|
| Ex. | Resinate sample | monomer | After 2 h | After 4 h | After 7 h | Average |
| 24 | 30% MO6 | 30 | 8.68 | 8.34 | 7.54 | 8.18 |
| 25 | SYLVAPRINT ™ GS62126 T37 | 0 | 8.47 | 8.14 | 7.61 | 8.07 |

Examples 26-30

Properties of Ink Containing Fatty Acid Monomer

In these examples, ink samples (comprising 3% pigment, 17.43% toluene and 67.57% let-down) at 30 seconds viscosity and further comprising resinate containing up to 30% of acid as MO6 fatty acid monomer, were analyzed for various properties. The properties are compared to those of varnish samples devoid of MO6 fatty acid monomer. Test findings are summarized in Table 10.

TABLE 10

| | Example | | | | |
|---|---|---|---|---|---|
| | 26 | 27 | 28 | 29 | 30 |
| Resinate sample | MERIGRAL ™ HV | 0% MO6 | 10% MO6 | 30% MO6 | SYLVAPRINT ™ GS62126 T37 |
| Percent of acid as MO6 fatty acid monomer | 0 | 0 | 10 | 30 | 0 |
| Solid content (%) | 19.9 | 20.1 | 19.5 | 16.4 | 20.5 |
| Gloss 6μ on APCO 2.2 | 63.4% | 63.5% | 61.1% | 57.1% | 61.0% |
| Optical density 6μ | 1.26 | 1.26 | 1.26 | 1.27 | 1.26 |
| Opacity (1 = most transparent) | 3 | 3 | 2 | 1 | 3 |
| 'Hot blocking' (1 = best) | 1 | 1 | 1 | 1 | 1 |
| Penetration (1 = best) | 3 | 2 | 1 | 3 | 4 |
| Optical density 20% | 0.19 | 0.22 | 0.22 | 0.25 | 0.22 |
| Optical density 40% | 0.36 | 0.40 | 0.40 | 0.45 | 0.40 |
| Optical density 60% | 0.60 | 0.64 | 0.65 | 0.69 | 0.63 |
| Optical density 80% | 0.86 | 0.94 | 0.90 | 0.99 | 0.85 |
| Optical density 100% | 1.18 | 1.32 | 1.30 | 1.31 | 1.20 |
| Gloss on 100% screen | 38.0 | 43.6 | 42.0 | 42.5 | 40.0 |

Examples 31-35

Properties of Varnish Containing Fatty Acid Monomer

In these examples, varnish samples comprising resinate containing up to 50% of acid as MO6 fatty acid monomer were analyzed for viscosity and solid content. The properties are compared to those of varnish samples devoid of MO6 fatty acid monomer. Test findings are summarized in Table 11.

TABLE 11

| Ex. | Resinate sample | Percent of acid as MO6 fatty acid monomer | Percent as solids | Viscosity (mPa · s) |
|---|---|---|---|---|
| 31 | MERIGRAL ™ HV | 0 | 37.86 | 636.4 |
| 32 | 0% MO6 | 0 | 37.98 | 624.4 |
| 33 | 30% MO6 | 30 | 38.49 | 130.0 |
| 34 | 50% MO6 | 50 | 35.50 | 381.9 |
| 35 | SYLVAPRINT ™ GS62126 T37 | 0 | 36.82 | 617.3 |

Examples 36-40

Properties of Varnish at Constant Viscosity

In these examples, varnish samples comprising resinate containing up to 50% of acid as MO6 fatty acid monomer, and at 1 dPa·s viscosity, were analyzed for various properties. The properties are compared to those of varnish samples devoid of MO6 fatty acid monomer. Test findings are summarized in Table 12.

TABLE 12

| Ex. | Resinate sample | Percent of acid as MO6 fatty acid monomer | Viscosity (dPa · s) | Percent as solids | Blocking Stals (min) | Fingertip drying time (s) |
|---|---|---|---|---|---|---|
| 36 | MERIGRAL ™ HV | 0 | 1 | 31.64 | 15-18 | 29 |
| 37 | 0% MO6 | 0 | 1 | 32.22 | 12-15 | 28 |
| 38 | 30% MO6 | 30 | 1 | 35.48 | 6-9 | 29 |
| 39 | 50% MO6 | 50 | 1 | 29.51 | >18 | 30 |
| 40 | SYLVAPRINT ™ GS62126 T37 | 0 | 1 | 31.77 | 12-15 | 27 |

Examples 41-44

Diluting Curves of Varnish Containing Monomer Fatty Acid

In these examples, varnish samples comprising resinate containing up to 50% of acid as MO6 fatty acid monomer were analyzed for dilution time as a function of solids content, compared to varnish samples devoid of MO6 fatty acid monomer. Test findings are summarized in Table 13.

TABLE 13

| Ex. | Resinate sample | Percent of acid as monomer fatty acid | DILUTION TIMES (s) Solid in toluene (wt %) | | | | | | | | | | | | |
|---|---|---|---|---|---|---|---|---|---|---|---|---|---|---|---|
| | | | 38.5 | 38.0 | 37.9 | 35.5 | 35 | 33 | 31 | 29 | 27 | 25 | 23 | 21 | 19 | 17 |
| 41 | MERIGRAL ™ HV | 0 | — | — | 584 | — | 205 | 100 | 54 | 36 | 28 | 24 | 23 | — | — | — |
| 42 | 0% MO6 | 0 | — | 637 | — | — | 167 | 81 | 50 | 36 | 29 | 26 | 24 | 23 | — | — |
| 43 | 30% MO6 | 30 | 100 | — | — | — | 50 | 38 | 32 | 28 | 25 | 24 | — | — | — | — |
| 44 | 50% MO6 | 50 | — | — | — | 301 | — | 152 | 104 | 59 | 51 | 34 | 29 | 26 | 24 | 22 |

Examples 45-49

Solvent Retention of Varnish Containing Monomer Fatty Acid

In these examples, varnish samples comprising resinate containing up to 50% of acid as MO6 fatty acid monomer were analyzed for solvent retention as a function of time, compared to varnish samples devoid of MO6 fatty acid monomer. Test findings are summarized in Table 14.

Examples 50-54

Properties of Ink Containing Monomer Fatty Acid

In these examples, ink samples (comprising 3% pigment, 21.72% toluene and 63.28% let-down) at 30 seconds viscosity and further comprising resinate containing up to 50% of acid as MO6 fatty acid monomer, were analyzed for various properties. These properties are compared to those of varnish samples devoid of MO6 fatty acid monomer. Test findings are summarized in Table 15.

TABLE 15

|  | Example | | | | |
|---|---|---|---|---|---|
|  | 50 | 51 | 52 | 53 | 54 |
| Resinate sample | MERIGRAL ™ HV | 0% MO6 | 30% MO6 | 50% MO6 | SYLVAPRINT ™ GS62126 T37 |
| Percent of acid as monomer fatty acid | 0 | 0 | 30 | 50 | 0 |
| Solid content (%) | 19.32 | 18.06 | 18.26 | 15.48 | 19.65 |
| Gloss 6μ on APCO 2.2 | 62.3% | 62.0% | 57.0% | 45.3% | 60.0% |
| Optical density 6μ | 1.46 | 1.40 | 1.46 | 1.40 | 1.44 |
| Opacity (1 = most transparent) | 3 | 3 | 2 | 4 | 1 |
| 'Hot blocking', one layer (1 = best) | 1 | 1 | 1 | 1 | 1 |
| 'Hot blocking', 3 layers (1 = best) | 1 | 1 | 2 | 2 | 3 |
| Penetration (1 = best) | 1 | 1 | 2 | 2 | 3 |
| Optical density 20% | 0.19 | 0.18 | 0.24 | 0.24 | 0.21 |
| Optical density 40% | 0.40 | 0.41 | 0.43 | 0.43 | 0.41 |
| Optical density 60% | 0.64 | 0.68 | 0.67 | 0.68 | 0.67 |
| Optical density 80% | 0.91 | 0.97 | 0.94 | 0.96 | 0.95 |
| Optical density 100% | 1.29 | 1.34 | 1.29 | 1.36 | 1.33 |
| Gloss on 100% screen | 39.7 | 42.5 | 40.5 | 34.5 | 41.2 |

TABLE 14

| Ex. | Resinate sample | Percent of acid as monomer fatty acid | Solvent retention (%) | | | |
|---|---|---|---|---|---|---|
|  |  |  | After 2 h | After 4 h | After 7 h | Average |
| 45 | MERIGRAL ™ HV | 0 | 9.76 | 9.27 | 8.77 | 9.27 |
| 46 | 0% MO6 | 0 | 11.66 | 11.23 | 11.16 | 11.35 |
| 47 | 30% MO6 | 30 | 9.18 | 8.84 | 8.04 | 8.68 |
| 48 | 50% MO6 | 50 | 12.33 | 12.07 | 12.04 | 12.15 |
| 49 | SYLVAPRINT ™ GS62126 T37 | 0 | 9.03 | 8.25 | 8.05 | 8.44 |

Example 55

Resinate with 30 Percent of Acid from Monomer, Prepared by Fusion Method

A reaction vessel was charged with tall oil rosin (TOR), Chinese gum rosin and MO6 fatty acid monomer at ambient temperature, and the mixture was melted by raising its temperature to about 175° C. The reaction vessel was then further charged with maleic anhydride, and the reaction mixture was heated to about 200° C. for about 30 minutes. The reaction mixture was then cooled to about 190° C. before the reaction vessel was further charged slowly with a slurry of xylene, tall oil fatty acid (TOFA), calcium hydroxide and magnesium oxide. The reaction mixture was then heated to about 235° C. and the reaction vessel was further charged with acetic acid. The reaction mixture was heated to about 255° C. and analyzed for acid number and viscosity. The reaction mixture was then held at about 255° C. for about 60 minutes more and analyzed again for acid number and viscosity. The reaction mixture was then held at about 255° C. for about 130 minutes more and analyzed again for acid number and viscosity. The reaction continued to be held at about 255° C. for several additional hours, and was analyzed for acid number and viscosity as deemed necessary. Percent composition (by mass) of the total reaction mixture, sample acid numbers, and sample viscosity measurements are indicated in Table 16.

TABLE 16

| Component | Mass percent of total mixture |
|---|---|
| TOR | 35.75 |
| Chinese gum rosin | 15.32 |
| MO6 Monomer | 22.16 |
| Maleic anhydride | 5.38 |
| Ca(OH)$_2$ (97% in water) | 5.29 |
| MgO | 1.19 |
| TOFA | 0.23 |
| Xylene (in slurry) | 9.58 |
| Xylene (wash) | 4.56 |
| Acetic acid (glacial) | 0.55 |
| Weight of total mixture: | 1096.50 grams |
| Percent yield | 82.48 |

TABLE 16-continued

| (theoretical) Percent of acid equivalents from MO6 | | 25.6 |
|---|---|---|
| | Acid value (g/mL KOH) | Viscosity (mPas) |
| Sample #1: | 92.07 | 14.2 |
| Sample #2: | 87.3 | 17 |
| Sample #3: | 69.46 | 18 |
| Final sample: | 68.8 | 24 |

Examples 56-64

Resinates with 30 Percent of Acid From Monomer, Prepared by Fusion Method

Resinates wherein about 30 wt % of the acidic components of the reaction mixture is derived from Monomer, were prepared in a manner similar to that described in EXAMPLE 55. Percent composition (by mass) of the total reaction mixture, sample acid numbers, and sample viscosity measurements are indicated in Table 17.

TABLE 17

| | Example | | | | | | | | | | | |
|---|---|---|---|---|---|---|---|---|---|---|---|---|
| Component | 56a | 56b | 57a | 57b | 58 | 59 | 60 | 61a | 61b | 62 | 63 | 64 |
| | Mass percent of total mixture | | | | | | | | | | | |
| SYLVAROS ™ 85 tall oil rosin | 34.14 | 34.14 | 14.63 | 14.63 | — | — | — | — | — | — | — | — |
| Chinese gum rosin | 14.63 | 14.63 | 34.14 | 34.14 | — | — | — | — | — | — | — | — |
| SYLVAROS ™ NCY tall oil rosin | — | — | — | — | 47.08 | 46.26 | 48.20 | 48.51 | 48.51 | 48.41 | 48.68 | 48.54 |
| MO6 Monomer | 21.16 | 21.16 | 21.16 | 21.16 | 20.18 | 19.83 | 20.66 | 20.79 | 20.79 | 20.75 | 20.73 | 20.80 |
| Maleic anhydride | 5.49 | 5.49 | 5.49 | 5.49 | 5.54 | 5.44 | 5.67 | 5.71 | 5.71 | 5.70 | 5.68 | 5.71 |
| Ca(OH)$_2$ (97% in water) | 5.92 | 5.92 | 5.92 | 5.92 | 6.59 | 6.91 | 6.21 | 6.09 | 6.09 | 6.18 | 6.06 | 6.05 |
| MgO | 1.33 | 1.33 | 1.33 | 1.33 | 1.49 | 1.56 | 1.40 | 1.37 | 1.37 | 1.38 | 1.35 | 1.36 |
| TOFA | 0.22 | 0.22 | 0.22 | 0.22 | 0.22 | 0.22 | 0.23 | 0.23 | 0.23 | 0.23 | 0.27 | 0.23 |
| Xylene (in slurry) | 10.89 | 10.89 | 10.89 | 10.89 | 12.13 | 12.70 | 11.61 | 11.23 | 11.23 | 11.30 | 11.18 | 11.15 |
| Xylene (wash) | 5.66 | 5.66 | 5.66 | 5.66 | 6.15 | 6.48 | 5.40 | 5.44 | 5.44 | 5.42 | 5.41 | 5.53 |
| Acetic acid (glacial) | 0.57 | 0.57 | 0.57 | 0.57 | 0.62 | 0.60 | 0.63 | 0.63 | 0.63 | 0.63 | 0.63 | 0.63 |
| Total mixture weight (grams) | 1148.25 | 1148.25 | 1148.25 | 1148.25 | 1137.50 | 1157.50 | 1111.00 | 1103.85 | 1103.85 | 1106.15 | 1109.25 | 1103.25 |
| Percent yield (theoretical) | 79.69 | 79.69 | 79.69 | 79.69 | 77.22 | 76.13 | 78.77 | 79.19 | 79.19 | 79.08 | 79.29 | 79.21 |
| Percent of acid equivalents from MO6 | 24.9 | 24.9 | 24.6 | 24.6 | 18.9 | 18.9 | 18.9 | 18.9 | 18.9 | 18.9 | 19.0 | 18.9 |
| Final acid value (g/mL KOH) | 71 | 59.18 | 63.4 | 55.3 | 64.9 | — | 76.25 | 66.72 | 74.78 | 64.9 | — | 71.25 |
| Sample 1 viscosity (mPas) | — | — | — | — | 118 | — | 48 | 31.3 | — | 42.5 | — | 33.6 |
| Sample 2 viscosity (mPas) | — | — | — | — | — | — | 525 | 100.7 | — | 102 | — | 118.5 |
| Final viscosity (mPas) | 214 | 243 | 72 | * | 1300 | — | 105 | 507 | 190 | 1570 | — | 345 |

*Too viscous to be measured

Examples 65-67

Resinates with 30 Percent of Acid from Monomer, Prepared by Fusion Method

Resinates wherein about 30 wt % of the acidic components of the reaction mixture is derived from Monomer, were prepared in a manner similar to that described in EXAMPLE 55, substituting HRJ1367 phenolic resin for the maleic anhydride. Percent composition (by mass) of the total reaction mixture, sample acid numbers, and sample viscosity measurements are indicated in Table 18.

TABLE 18

| | Example | | |
|---|---|---|---|
| | 65 | 66 | 67 |
| Component | Mass percent of total mixture | | |
| TOR | 16.20 | 15.82 | 15.38 |
| Chinese gum rosin | 37.79 | 36.92 | 35.89 |
| MO6 Monomer | 23.14 | 22.60 | 21.97 |
| HRJ 1367 phenolic resin | 3.32 | 3.01 | 3.00 |
| $Ca(OH)_2$ (97% in water) | 5.83 | 6.50 | 7.17 |
| Xylene (in slurry) | 8.75 | 9.74 | 10.75 |
| Xylene (wash) | 3.94 | 4.38 | 4.84 |
| Acetic acid (80%) | 1.05 | 1.02 | 1.00 |
| Total mixture weight (grams) | 1234.93 | 1264.00 | 1300.24 |
| Percent yield (theoretical) | 84.04 | 82.29 | 80.53 |
| Percent of acid equivalents from MO6 | 30.2 | 30.2 | 30.2 |
| Final acid value (g/mL KOH) | 61 | 51 | 36 |
| Final viscosity (mPas) | 14.0 | 14.0 | 49.4 |
| Final appearance | Clear | Clear | Slightly hazy |

Examples 68-70

Resinates with 20 Percent of Acid from Monomer, by Fusion Method

Resinates wherein about 20 wt % of the acidic components of the reaction mixture is derived from Monomer, were prepared in a manner similar to that described in EXAMPLE 55 and EXAMPLES 65-67. Percent composition (by mass) of the total reaction mixture, acid numbers, and viscosity measurements are indicated in Table 19.

TABLE 19

| | Example | | |
|---|---|---|---|
| | 68 | 69 | 70 |
| Component | Mass percent of total mixture | | |
| TOR | 16.77 | 18.04 | 17.81 |
| Chinese gum rosin | 39.19 | 42.10 | 41.55 |
| MO6 Monomer | 13.93 | 15.04 | 14.84 |
| Maleic anhydride | 5.49 | — | — |
| HRJ 1367 phenolic resin | — | 3.02 | 2.98 |
| $Ca(OH)_2$ (97% in water) | 5.92 | 6.50 | 6.82 |
| MgO | — | — | — |
| TOFA | — | — | — |
| Xylene (in slurry) | 10.89 | 9.74 | 10.24 |
| Xylene (wash) | 5.66 | 4.38 | 4.61 |
| Acetic acid | 0.57 (glacial) | 1.17 (80%) | 1.15 (80%) |
| Total mixture weight (grams) | 1400.00 | 1108.38 | 1123.15 |
| Percent yield (theoretical) | 80.04 | 82.22 | 81.35 |
| Percent of acid equivalents from MO6 | 15.0 | 20.1 | 20.1 |
| Final acid value (g/mL KOH) | 60.7 | 42 | 39 |
| Final viscosity (mPas) | 237.0 | 16.8 | 13.0 |
| Final appearance | — | Clear | Clear |

Examples 71-74

Resinates with 10-15 Percent of Acid from Monomer, Prepared by Fusion Method Resinates wherein about 10-15 wt % of the acidic components of the reaction mixture is derived from Monomer, were prepared in a manner similar to that described in EXAMPLE 55 and EXAMPLES 65-67. Percent composition (by mass) of the total reaction mixture, sample acid numbers, and sample viscosity measurements are indicated in Table 20.

TABLE 20

| | Example | | | |
|---|---|---|---|---|
| | 71 | 72 | 73 | 74 |
| Component | Mass percent of total mixture | | | |
| TOR | 18.71 | 20.29 | 19.18 | 19.15 |
| Chinese gum rosin | 43.72 | 47.34 | 44.76 | 44.69 |
| MO6 Monomer | 7.89 | 7.51 | 11.28 | 11.27 |
| Maleic anhydride | 6.12 | — | — | — |
| HRJ 1367 phenolic resin | — | 2.99 | 2.97 | 2.97 |
| $Ca(OH)_2$ (97% in water) | 5.74 | 6.47 | 6.47 | 6.46 |
| MgO | 1.29 | — | — | — |
| TOFA | 0.20 | — | — | — |
| Xylene (in slurry) | 10.53 | 9.71 | 9.71 | 9.70 |
| Xylene (wash) | 5.18 | 4.37 | 4.37 | 4.36 |
| Acetic acid | 0.63 (glacial) | 1.31 (80%) | 1.24 (80%) | 1.40 (80%) |
| Total mixture weight (grams) | 1255.10 | 985.76 | 1042.58 | 4176.78 |
| Percent yield (theoretical) | 81.05 | 82.20 | 82.24 | 82.23 |
| Percent of acid equivalents from MO6 | 7.6 | 10.0 | 15.1 | 15.1 |
| Final acid value (g/mL KOH) | 62.7 | 48 | 47 | 45 |
| Final viscosity (mPas) | 125.0 | 13 | 13 | 20 |
| Final appearance | — | Clear | Clear | Clear |

Examples 75-80

Resinates with 50 Percent of Acid from Monomer, Prepared by Fusion Method

Resinates wherein about 50 wt % of the acidic components of the reaction mixture is derived from Monomer, were prepared in a manner similar to that described in EXAMPLE 55. Percent composition (by mass) of the total reaction mixture, sample acid numbers, and sample viscosity measurements are indicated in Table 21.

Examples 81C-90C(Comparative)

Resinates with no Monomer, Prepared by Fusion Method

Resinates wherein essentially none of the acidic components of the reaction mixture are derived from Monomer, were prepared in a manner similar to that described in EXAMPLE 55 and EXAMPLES 65-67. Percent composition (by mass) of the total reaction mixture, sample acid numbers, and sample viscosity measurements are indicated in Table 22.

TABLE 21

| Component | 75 | 76 | 77 | 78 | 79a | 79b | 80 |
|---|---|---|---|---|---|---|---|
| | \multicolumn{7}{c}{Mass percent of total mixture} | | | | | | |
| TOR | 32.66 | 34.52 | 33.88 | 34.97 | 35.14 | 35.14 | — |
| Chinese gum rosin | — | — | — | — | — | — | 37.90 |
| MO6 Monomer | 32.66 | 34.52 | 33.88 | 34.97 | 35.14 | 35.14 | 37.90 |
| Maleic anhydride | 5.26 | 5.25 | 5.24 | 5.32 | 5.34 | 5.34 | 5.76 |
| Ca(OH)$_2$ (97% in water) | 7.23 | 6.46 | 6.64 | 6.23 | 6.08 | 6.08 | 4.12 |
| MgO | 1.64 | 1.45 | 1.50 | 1.40 | 1.36 | 1.36 | 1.19 |
| TOFA | 0.25 | 0.21 | 0.20 | 0.21 | 0.21 | 0.21 | 0.23 |
| Xylene (in slurry) | 13.31 | 11.91 | 12.15 | 11.40 | 11.19 | 11.19 | 8.05 |
| Xylene (wash) | 6.57 | 5.25 | 6.08 | 5.06 | 5.09 | 5.09 | 4.12 |
| Acetic acid (glacial) | 0.42 | 0.44 | 0.44 | 0.45 | 0.45 | 0.45 | 0.72 |
| Total mixture weight (grams) | 1217.10 | 1200.32 | 1201.45 | 1184.70 | 1179.15 | 1179.15 | 1093.02 |
| Percent yield (theoretical) | 75.47 | 78.69 | 77.50 | 79.55 | 79.83 | 79.83 | 85.74 |
| Percent of acid equivalents from MO6 | 32.7 | 33.3 | 33.1 | 33.3 | 33.3 | 33.3 | 49.2 |
| Final acid value (g/mL KOH) | 68.89 | 67.43 | 77.00 | 63.87 | 78.40 | 80.10 | 100.7 |
| Sample 1 viscosity (mPas) | — | — | — | — | — | 76 | — |
| Sample 2 viscosity (mPas) | — | — | — | — | — | 100 | — |
| Final viscosity (mPas) | * | 503 | * | 98.7 | 314 | 235 | >20 |

*Too viscous to be measured.

TABLE 22

| Component | 81C | 82C | 83C | 84C | 85C | 86C | 87C | 88C | 89C | 90C |
|---|---|---|---|---|---|---|---|---|---|---|
| | \multicolumn{10}{c}{Mass percent of total mixture} | | | | | | | | | |
| TOR | 69.44 | 72.67 | 71.30 | 49.85 | 80.33 | 81.52 | 80.64 | 23.15 | 23.56 | 23.99 |
| Chinese gum rosin | — | — | — | 21.36 | — | — | — | 54.03 | 54.99 | 55.97 |
| Maleic anhydride | 5.25 | 5.50 | 5.50 | 5.49 | — | — | — | — | — | — |
| HRJ 1367 phenolic resin | — | — | — | — | 3.34 | 3.00 | 3.00 | 3.00 | 3.00 | 2.97 |
| Ca(OH)$_2$ (97% in water) | 6.32 | 5.40 | 5.82 | 5.68 | 4.77 | 4.50 | 4.79 | 5.86 | 5.44 | 5.59 |
| MgO | 1.42 | 1.21 | 1.30 | 1.28 | — | — | — | — | — | — |
| TOFA | 0.20 | 0.22 | 0.23 | 0.23 | — | 0.25 | 0.25 | 0.26 | 0.26 | 0.25 |
| Xylene (in slurry) | 11.57 | 9.78 | 10.62 | 10.43 | 7.23 | 6.80 | 7.18 | 8.79 | 8.20 | 7.12 |
| Xylene (wash) | 5.34 | 4.66 | 4.66 | 5.12 | 3.40 | 3.00 | 3.21 | 3.96 | 3.58 | 3.19 |
| Acetic acid | 0.45 (glacial) | 0.56 (glacial) | 0.56 (glacial) | 0.56 (glacial) | 0.94 (80%) | 0.94 (80%) | 0.94 (80%) | 0.95 (80%) | 0.97 (80%) | 0.93 (80%) |

TABLE 22-continued

| Component | 81C | 82C | 83C | 84C | 85C | 86C | 87C | 88C | 89C | 90C |
|---|---|---|---|---|---|---|---|---|---|---|
| | | | | | Mass percent of total mixture | | | | | |
| Total mixture weight (grams) | 1123.30 | 1073.40 | 1073.00 | 1400.00 | 1000.00 | 1000.00 | 1400.00 | 1364.95 | 1341.25 | 1412.00 |
| Percent yield (theoretical) | 78.32 | 81.38 | 80.28 | 80.54 | 85.33 | 86.26 | 85.55 | 83.84 | 84.99 | 86.39 |
| Final acid value (g/mL KOH) | 57.3 | 63.8 | 58 | 54.7 | — | — | — | 53 | 68 | — |
| Final viscosity (mPas) | 324 | 85 | 214 | 52 | — | 14 | 16 | 20 | 16 | — |
| Final appearance | — | — | — | — | — | — | — | Hazy | Clear | — |

Examples 91C-92C (Comparative)

Resinates with no Monomer, Prepared by Fusion Method

Resinates wherein essentially none of the acidic components of the reaction mixture are derived from Monomer, were prepared in a manner similar to that described in EXAMPLE 55. Percent composition (by mass) of the total reaction mixture, sample acid numbers, and sample viscosity measurements are indicated in Table 23.

TABLE 23

| | Example | |
|---|---|---|
| | 91C | 92C |
| Component | Mass percent of total mixture | |
| TOR | 85.66 | 86.66 |
| Octyl phenol | 3.09 | — |
| Bisphenol A | 0.91 | — |
| p-tert-Butylphenol | — | 2.88 |
| Paraformaldeyhde (91%) | 1.91 | 1.93 |
| Ca(OH)$_2$ (97% in water) | 5.08 | 5.14 |
| Acetic acid (80%) | 3.36 | 3.40 |
| Total mixture weight (grams) | 1102.74 | 1090.10 |
| Percent yield (theoretical) | 94.01 | 93.94 |

Examples 93C, 94-95, 96C-97C

Properties of Ink Formulations Containing Monomer

In these examples, samples of ink formulations comprising resinate containing up to 30% of acid as MO6 Monomer were analyzed for viscosity and solid content, and the properties of these samples were compared to those of ink formulation samples comprising resinate devoid of MO6 Monomer. Test findings are summarized in Table 24.

TABLE 24

| Ex. | Resinate sample | Percent of acid as MO6 fatty acid monomer | Percent as solids | Viscosity (mPa · s) |
|---|---|---|---|---|
| 93C | SYLVAPRINT ™ 3874 | 0 | 44.02 | 214 |
| 94 | 11% MO6 | 11 | 46.98 | 128 |
| 95 | 30% MO6 | 30 | 44.81 | 230 |
| 96C | 0% MO6 | 0 | 42.92 | 114 |
| 97C | 0% MO6 | 0 | 40.34 | 128 |

Examples 98C, 99-100, 101C-102C

Solvent Retention of Ink Formulations Containing Monomer

In these examples, samples of ink formulations comprising resinate containing up to 30% of acid as MO6 Monomer were analyzed for solvent retention as a function of time, compared to ink formulation samples devoid of MO6 Monomer. Of the samples tested, those containing Monomer were determined to have the least solvent retention, and therefore the best ink-drying properties. Test findings are summarized in Table 25.

TABLE 25

| | | Percent of acid | Solvent retention (%) | | | |
|---|---|---|---|---|---|---|
| Ex. | Resinate sample | as MO6 fatty acid monomer | After 2 h | After 4 h | After 7 h | Average |
| 98C | SYLVAPRINT ™ 3874 | 0 | 16.26 | 15.50 | 13.94 | 15.23 |
| 99 | 11% MO6 | 11 | 7.13 | 6.47 | 6.40 | 6.67 |
| 100 | 30% MO6 | 30 | 8.70 | 7.44 | 7.11 | 7.75 |
| 101C | 0% MO6 | 0 | 13.80 | 12.67 | 11.55 | 12.67 |
| 102C | 0% MO6 | 0 | 11.28 | 10.78 | 10.65 | 10.90 |

Examples 103C, 104-105, 106C-107C

Properties of Ink Containing Monomer

In these examples, ink samples (comprising 3% pigment, toluene and let-down as indicated) at 30 seconds viscosity and further comprising resinate containing up to 30% of acid as MO6 Monomer, were analyzed for various properties. The properties are compared to those of ink samples devoid of MO6 Monomer. Test findings are summarized in Table 26.

TABLE 26

| | Example | | | | |
|---|---|---|---|---|---|
| | 103C | 104 | 105 | 106C | 107C |
| Resinate sample | SYLVAPRINT™ 3874 | 11% MO6 | 30% MO6 | 0% MO6 | 0% MO6 |
| Percent of acid as MO6 fatty acid monomer | 0 | 11 | 30 | 0 | 0 |
| Toluene (wt %) | 4.22 | 6.47 | 5.25 | 4.92 | 6.16 |
| Let-down (wt %) | 80.78 | 78.53 | 79.75 | 80.08 | 78.84 |
| Solid content (%) | 21.77 | 21.74 | 21.62 | 21.66 | 21.04 |
| Gloss 6µ on APCO 2.2 | 76 | 74 | 76 | 75 | 78 |
| Optical density 6µ | 1.28 | 1.22 | 1.26 | 1.24 | 1.27 |
| 'Hot blocking' 12µ (1 = best)* | 4 | 3 | 2 | 1 | 5 |
| Optical density 20% | 0.24 | .024 | .025 | .024 | .025 |
| Optical density 40% | 0.43 | 0.42 | 0.43 | 0.41 | 0.43 |
| Optical density 60% | 0.64 | 0.63 | 0.65 | 0.62 | 0.64 |
| Optical density 80% | 0.87 | 0.87 | 0.87 | 0.86 | 0.87 |
| Optical density 100% | 1.27 | 1.27 | 1.27 | 1.28 | 1.28 |
| Gloss on 100% screen | 52.0 | 48.6 | 46 | 46.8 | 44.9 |

*After application, print was immediately put in heat sealer (without drying).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A resinate composition comprising the reaction product of reactants, the reactants comprising: (a) at least one rosin selected from the group consisting of wood rosin, gum rosin, and tall oil rosin; (b) Monomer, and (c) metal salt, the metal salt comprising a metal cation, the metal selected from Group IIA or Group IIB metals of the Periodic Table.

2. The composition of claim 1 wherein the metal is selected from the group consisting of zinc, magnesium, calcium, and mixtures thereof.

3. The composition of claim 1 wherein the metal salt comprises an anion selected from the group consisting of acetate, carbonate, bicarbonate, formate, hydroxide, oxalate, oxide, and mixtures thereof.

4. The composition of claim 1 wherein the reactants further comprise α,β-unsaturated carboxylic compound, tall oil fatty acid, or a combination thereof wherein the α,β-unsaturated carboxylic compound is selected from the group consisting of maleic anhydride, fumaric acid, mono ($C_1$-$C_{12}$) ester of fumaric acid, di($C_1$-$C_{12}$ alkyl) ester of fumaric acid, acrylic acid, $C_1$-$C_{12}$ alkyl ester of acrylic acid, methacrylic acid, $C_1$-$C_{12}$ alkyl ester of methacrylic acid, itaconic acid, $C_1$-$C_{12}$ alkyl ester of itaconic acid, and mixtures thereof.

5. The composition of claim 1, comprising up to about 80 wt % solvent, based on the total weight of the composition.

6. The composition of claim 1, wherein the solvent is selected from the group consisting of lower organic acid, hydrocarbon, water, and mixtures thereof.

7. The composition of claim 1, wherein the solvent is composed of about 70-100 wt % hydrocarbon, up to about 15 wt % lower organic acid, and optionally up to about 15 wt % water.

8. The composition of claim 1 wherein the reactants further comprise a reactant selected from the group consisting of phenol, aldehyde, and phenolic resin, and the reactants comprise 0-10 wt % α,β-unsaturated carboxylic compound.

9. The composition of claim 8 wherein the reactants comprise 0-2 wt % α,β-unsaturated carboxylic compound and the metal comprises calcium.

10. The composition of claim 1 wherein the reactants comprise α,β-unsaturated carboxylic compound, and the composition contains 0-10 wt % solvent.

11. The composition of claim 10 wherein the reactants comprise calcium and zinc salts, and the composition contains 0-5 wt % solvent.

12. A process for preparing a resinate composition comprising the steps of (a) melting at least one rosin selected from the group consisting of wood rosin, gum rosin, and tall oil rosin in a reaction vessel, optionally in admixture with Monomer; (b) charging the reaction vessel with Monomer if Monomer is not already present in the reaction vessel; (c) charging the reaction vessel with a metal salt comprising a cation selected from Group IIA or Group IIB of the Periodic Table, and optionally solvent, to provide a reaction mixture; (d) incubating the reaction mixture at elevated temperature to produce a reaction product; and (e) cooling the reaction product (e) to yield a resinate composition.

13. The process of claim 12 wherein the reactants comprise acid equivalents attributed to fatty acid and acid equivalents attributed to rosin, and Monomer contributes about 55-1% of the total acid equivalents attributed to rosin and fatty acid.

14. The process of claim 12 wherein the reactants comprise acid equivalents attributed to Monomer and acid equivalents attributed to rosin, and the ratio of acid equivalents attributed to rosin:acid equivalents attributed to Monomer is in the range of about 0.5:1 to 15:1.

15. The process of claim 12 wherein the cation of the metal salt is selected from the group consisting of a cation of zinc, magnesium, calcium, and mixtures thereof.

16. The process of claim 12 wherein the anion of the metal salt is selected from the group consisting of acetate, carbonate, bicarbonate, formate, hydroxide, oxalate, oxide, and mixtures thereof.

17. The process of claim 12 wherein the solvent is selected from one or a combination of an inorganic solvent and an organic solvent, wherein the organic solvent does not contain a hydroxyl, aldehyde, alkenyl, cycloalkenyl, or nitrogen-containing group.

18. The process of claim 17 wherein the solvent is selected from the group consisting of lower organic acid, hydrocarbon, water, and mixtures thereof.

19. The process of claim 17 wherein the solvent comprises about 70-100 wt % hydrocarbon, up to about 15 wt % lower organic acid, and 0-15 wt % water.

20. The process of claim 12 further including the step of heating the reaction product to evaporate excess solvent.

21. The process of claim 12, further comprising at least one step selected from (a) adding α,β-unsaturated carboxylic compound to the reaction vessel after rosin melting and prior to incubation; or (b) charging the reaction vessel with tall oil fatty acid after rosin melting and prior to incubation.

22. The process of claim 12 wherein maleic anhydride is added to the reaction vessel.

23. The process of claim 12 further comprising (a) charging the reaction vessel with a phenolic compound; and (b) charging the reaction vessel with formaldehyde or a reactive equivalent thereof.

24. The process of claim 12 further comprising charging the reaction vessel with polyhydric alcohol.

25. The process of claim 12 comprising the ordered steps of (a) melting the rosin in a reaction vessel at about 170° C., optionally in admixture with Monomer; (b) charging the reaction vessel with Monomer if Monomer is not already present in the reaction vessel; (c) heating the reaction mixture at about 225° C. for about 1 hour; (d) cooling the reaction mixture to less than about 100° C.; (e) charging the reaction vessel with one or more of lower organic acid, water and hydrocarbon; (f) charging the reaction vessel with a slurry comprising hydrocarbon solvent and alkaline metal salt; (g) incubating the reaction mixture at less than about 100° C. for about 30 minutes; and (h) heating the reaction mixture at about 115° C. for about 1-2 hours before cooling and discharging said reaction mixture.

26. The process of claim 12 wherein the resinate composition is prepared by a fusion method and comprises (a) melting the rosin in a reaction vessel at about 170° C., optionally in admixture with Monomer; (b) charging the reaction vessel with Monomer if Monomer is not already present in the reaction vessel; (c) heating the reaction mixture at about 200° C. for about 1 hour; (d) charging the reaction vessel with a slurry comprising hydrocarbon solvent and alkaline metal salt; (e) incubating the reaction mixture about 250° C. for about 90 minutes; (f) charging the reaction vessel with lower organic acid; (g) further incubating the reaction mixture for about 1 hour before cooling and discharging the final reaction mixture.

27. The process of claim 26 wherein the reaction vessel is charged with about 20-85 wt % rosin, about 1-50 wt % Monomer, about 1-15 wt % alkaline metal salt, up to about 30 wt % hydrocarbon solvent, up to about 5 wt % lower organic acid, α,β-unsaturated carboxylic compound representing about 1-25 wt % of the reactants, and 0-5 wt % water.

28. The process of claim 26, wherein the slurry further comprises tall oil fatty acid representing up to about 2 wt % of the final reaction mixture.

* * * * *